Patented June 24, 1924.

1,499,164

UNITED STATES PATENT OFFICE.

EMANUEL FELHEIM, OF BERLIN-LICHTENRADE, GERMANY.

HIGHLY-CONCENTRATED STABLE SOLUTIONS OF SULPHUROUS ACID AND METHOD OF PRODUCING IT.

No Drawing.     Application filed February 12, 1924. Serial No. 692,425.

*To all whom it may concern:*

Be it known that I, EMANUEL FELHEIM, residing at Berlin-Lichtenrade, Germany, have invented certain new and useful Improvements in Highly-Concentrated Stable Solutions of Sulphurous Acid and Methods of Producing It, of which the following is a specification.

My invention relates to sulphurous acid solutions and an improved method of producing a highly concentrated solution of sulphurous acid which will not decompose or be liable to any reduction as regards its efficiency, for a very long time.

Sulphurous acid has been suggested heretofore as a reliable means for killing or exterminating vermins particularly bugs, bed-bugs, lice, flour-moths, scabmites and the like, but the acid has heretofore usually been employed in practice in a gaseous state. Such practice is objectionable for the reason that extremely large quantities of the gas are required in each case since in order to ensure the desired result, comparatively large rooms must be filled with the sulphurous acid gas.

The object of my invention is to remedy this defect and with this object in view I prepare a solution or liquor the main and efficient constituent of which is sulphurous acid, and which enables one to bring about and maintain in the closest vicinity of the single vermin a zone of sulphurous acid gas of sufficiently high concentration to produce a parasiticidal effect, without thereby filling the adjacent room with the gas as heretofore practiced.

According to my invention the method of producing the said parasiticidal solution or liquor consists in making a mixture of an acid or acids or of acid-salts of such acids, and a salt or salts adapted to decompose and develop or yield free sulphurous acid, and adding to said mixture a viscous substance of suitable nature. The addition of said viscous substance ensures a double effect inasmuch as, first, the acid or acids or acid salts (hereinafter referred to generically as "acid substances") are thereby prevented from reacting too violently with the sulphurous salt or salts, or in other words, the reaction and development of free sulphurous acid is retarded, and second, the developed sulphurous acid gas is prevented by the viscous substance present from escaping too quickly into the open air.

In carrying out my invention practically I mix a highly concentrated solution of potassium bisulfite or of sodium bisulfite with a highly concentrated solution of potassium bisulfate or sodium bisulfate and according to a preferred example, I add to the thus obtained mixture a viscous substance or liquor such as e. g. a highly concentrated solution of potassium lactate or sodium lactate.

In lieu of the hereinbefore mentioned potassium bisulfate and sodium bisulfate a viscous acid such as lactic acid may be employed.

It will be evident that my invention, whilst still being adhered to in its main essentials, may be varied and adapted in many ways, according to various requirements desired or most suitable under different circumstances.

What I claim is:—

1. As a new composition of matter, a mixture comprising an acid substance, a sulfite adapted to react therewith, and a substance giving a high degree of viscosity, in amount capable of preventing rapid escape of the sulphurous anhydrid into the atmosphere.

2. As a new composition of matter, adapted to slowly liberate $SO_2$, a mixture containing a sulfite compound and an acid material, capable of reacting with such sulfite compound, which acid material is present in amount capable of giving a high degree of viscosity, capable of preventing rapid escape of sulfur dioxide into the atmosphere.

3. A method of making a highly concentrated lasting solution of sulphurous acid, adapted for use in exterminating vermin, which comprises mixing together an acid substance, a sulfite compound adapted to develop sulphurous acid on contact with the said acid substance, in the presence of water, and a substance giving a high degree of viscosity to the solution, in amount capable of preventing rapid escape of sulfur dioxide into the atmosphere.

4. As a new composition of matter, adapted to slowly liberate sulfur dioxide, a mixture containing a sulfite compound, together with an acid material, adapted to react therewith, such composition including a substance containing the lactic acid radical in amount sufficient to prevent rapid escape of the $SO_2$ into the atmosphere.

In testimony whereof I have signed my name to this specification.

DR. EMANUEL FELHEIM.